United States Patent [19]

Dambacher

[11] Patent Number: 5,333,155
[45] Date of Patent: Jul. 26, 1994

[54] METHOD AND SYSTEM FOR TRANSMITTING DIGITAL AUDIO SIGNALS FROM RECORDING STUDIOS TO THE VARIOUS MASTER STATIONS OF A BROADCASTING NETWORK

[75] Inventor: Paul Dambacher, Ampfing, Fed. Rep. of Germany

[73] Assignee: Rohde & Schwarz GmbH & Co. KG, Munich, Fed. Rep. of Germany

[21] Appl. No.: 785,777

[22] Filed: Oct. 31, 1991

[30] Foreign Application Priority Data

Apr. 25, 1991 [DE] Fed. Rep. of Germany ....... 4113584
Aug. 2, 1991 [EP] European Pat. Off. .......... 9111300.3

[51] Int. Cl.$^5$ .............................................. H04B 1/66
[52] U.S. Cl. ........................................ 375/122; 381/30
[58] Field of Search .................... 375/122; 381/29, 30, 381/31, 33; 370/104.1; 455/12.1

[56] References Cited

U.S. PATENT DOCUMENTS

| | | | |
|---|---|---|---|
| 3,812,430 | 5/1971 | Schmidt et al. | 370/104.1 |
| 4,617,674 | 10/1986 | Mangulis et al. | 370/104.1 X |
| 4,686,672 | 8/1987 | Namiki | 370/104.1 X |
| 4,912,766 | 3/1990 | Forse | 370/104.1 |
| 5,072,495 | 12/1991 | Nawata | 370/104.1 |

OTHER PUBLICATIONS

Stoll et al. "High Quality Audio Bit-rate Reduction System Family for Different Applications", IEEE International Conf. on Communications ICC 1990, Atlanta Ga, 16–19 Apr. 1990 pp. 937–941. vol. 3.

Dehery et al. "A Musicam source codec for digital audio broadcasting and storage", ICASSP91: International Conf. on Acoustics, Speech & Signal Processing pp. 3605–3608 vol. 5, Apr. 14–17, 1991, Toronto, Ont.; Canada.

O. Klauk, D. Rottman, "DSR-Receiver for the Digital Sound Broadcasting via the European Satellites TV-SAT/TDF", IEEE Trans. on Consumer Electronics, vol. 35, No. 3 Aug. 1989. pp. 504–511.

News from Rohde & Schwarz, No. 114, summer of 1986, pp. 13–16.

Rohde & Schwarz undated data sheet, No. 818 501 E-1 "Audio Coder DCA".

Primary Examiner—Stephen Chin
Assistant Examiner—Bryan Webster
Attorney, Agent, or Firm—Hill, Steadman & Simpson

[57] ABSTRACT

For the purpose of transmitting digital audio signals from recording studios to the various broadcasting stations of a broadcasting network, the data flow of the digital audio signals to be transmitted is initially reduced in accordance with a technique which utilizes the psychoacoustic phenomena of the human ear. Then groups of these data-reduced digital audio signals are respectively encoded in a baseband in accordance with a DS1-technique and combined to form respective DS1/M-signals. Finally, the thus produced DS1/M-signals are transmitted in accordance with the DSR technique by use of a wide-band transmission system to the individual broadcasting stations of the broadcasting network.

14 Claims, 5 Drawing Sheets

| OCCUPANCY DSR CHANEL | L/R/MONO PER DS1 | | | L/R/ PER DSR CHANEL MONO | |
|---|---|---|---|---|---|
| | | DSR-u. MUSICAM PROTECTED | MUSICAM-PROTECTED | DSR-u. MUSICAM PROTECTED | MUSICAM-PROTECTED |
| DSR | 1/– | | | 16/– | |
| MUSICAM 64 | | 5/1 | 1/1 | 80/16 | 16/16 |
| MUSICAM 96 | | 3/1 | 1/– | 48/16 | 16/– |
| MUSICAM 128 | | 2/1 | –/1 | 32/16 | –/16 |

OCCUPANCY OF DSR CHANEL WITH DSR/DAB
(INTEGER NUMBER L/R PER DS1)

FIG. 5

METHOD AND SYSTEM FOR TRANSMITTING DIGITAL AUDIO SIGNALS FROM RECORDING STUDIOS TO THE VARIOUS MASTER STATIONS OF A BROADCASTING NETWORK

BACKGROUND OF THE INVENTION

1. Field of the Invention

The present invention relates to a method for transmitting digital audio signals from recording studios to various master stations of a broadcasting network.

2. Description of the Prior Art

For projected future digital broadcasting systems it will be necessary to transmit a multiplicity of individual programs from the various recording studios of the broadcasting corporations to the individual master stations of these broadcasting networks, which are planned on a country-wide basis.

The so-called DAB network (Digital Audio Broadcasting, described in "Digital Audio Broadcasting" ITU-COM 89, Geneva, October 1989, and in "Kunftige Systeme der digitalen Horfunkubertragung", Bayerischer Rundfunk, November 1990, both incorporated herein by reference) provides, for example, simultaneous broadcasting networks in which every DAB station transmits a plurality of digital audio signals, e.g. 6 stereo signals, in clock-synchronous and word-synchronous, i.e. bit-synchronous fashion, in a so-called COFDM signal (Coded Orthogonal Frequency Division and Multiplexing). Since a country may have a plurality of separate radio service areas, there results a large number of programs which must be fed to the DAB network of the service area or country, respectively. Assuming that there are four frequencies which are provided for simultaneous broadcasting networks, and further assuming that a big country comprises 10 networks each comprising six programs, this already totals 60 programs. Even if the known and technically mature so-called DS1/DSR satellite transmission were used for distributing the audio signals from the recording studios to the various master stations of the broadcasting network, the transmission would be limited to only 16 programs for each DSR channel, which would be insufficient for modern country-wide broadcasting networks with regional service.

With the so-called DS1 technique (Digital Sound 1Mbit/s), two audio signals or, respectively, a stereo signal and additional information, are transmitted in a serial stream. A scale factor is introduced for data reduction (European Patent Application 0 133 697 and paper "Audio-Coder DCA fur den digitalen Horfunk" in "Neues yon Rohde & Schwarz", No. 114, summer of 1986, pages 13–10, both incorporated herein by reference). 16 of these DS1 audio signals generated by a DS1-coder are then interlaced through a data multiplexer on the basis of the so-called DSR technique (Digital Satellite Radio), and are supplied in a 4-PSK-modulator for instance to a satellite earth station ("Neues yon Rohde & Schwarz", No. 114, page 14). The satellite transmitter transmits for example at 18 GHz to the satellite which in turn transmits at 12 GHz to the individual consumer satellite receivers. From the 4-PSK-demodulated digital stream the desired audio signals can be selected from a total of up to 16 digital audio signals through a demultiplexer/decoder, and can be made audible after digital-to-analog conversion.

For transmitting the digital audio signals from the recording studios to the master stations of a broadcasting network it has already been proposed to make use of the satellite transmission technique (Rohde & Schwarz study on "Program and Data Lines to VHF-FM-Transmitters", October 1990). But even a combination of the above-described DS1-DSR broadcasting techniques, which is quite common today, with such a satellite transmission technique would again result in a maximum of 16 programs per each DSR channel being transmitted from the recording studios to the various master stations of the broadcasting network, which is quite insufficient as has been explained above.

SUMMARY OF THE INVENTION

It is an object of the present invention to provide a simple method and a simple system by which it is possible in an economic way to broadcast a plurality of high-quality audio signals from the recording studios to the various master stations of a terrestrial digital or analog broadcasting network.

According to the method of the invention for transmitting digital audio signals from recording studios to various master stations of a broadcasting network, data flow of the digital audio signals) in accordance with a technique utilizing the psycho acoustic phenomena of the human ear. A plurality of the data-reduced digital audio signals are respectively coded in a baseband in accordance with a DS1 technique and combined to form a DS1/M signal. One or a plurality of the thus produced DS1/M signals are transmitted in accordance with the DSR technique by means of a wide-band transmission system to the various master stations of the broadcasting network.

The invention is particularly useful in a DAB transmitter network, in a common terrestrial VHF/FM-transmitter network, and also in an extended DSR mode.

The invention is based on the fact that, for transmitting the audio signals from a recording studio to the various master stations of a broadcasting network, the DS1/DSR technique, which is actually known for servicing consumer radio receivers through a satellite transmitter, is most suitable because the technical means required for performing this method are highly mature and have long proven very satisfactory. The DS1 coders and DSR multiplexers/modulators required for performing this method have in the meantime become commercially available, like the DSR demodulators, demultiplexers and decoders required on the receiver side. However, only sixteen individual programs can be transmitted by such a DS1/DSR technique since the known DSR coder provides only sixteen DS1 channels. Since it is necessary in future broadcasting networks to transmit considerably more programs simultaneously to the individual master stations, the present invention combines the DS1/DSR technique in the recording studio with an additional data reduction of the audio signals to be transmitted by taking into consideration the psychoacoustic phenomena of the human ear. A method suitable for this purpose is, for example, the so-called MUSICAM technique (Masking Universal Subband Integrated Coding And Multiplexing; described in "MUSICAM, A Universal Subband Coding System Description" by CCETT, IRT, Matsushita & Philips). In accordance with this known method, a data reduction of a digital audio signal to e.g. 128 or 96 or even 64 kbit/s for each monosignal can be achieved so that a plurality of such data-reduced audio signals can be transmitted in a DS1 signal. Due to this inventive combination, it is therefore possible to transmit a multiple of the digital signals which could actually be transmitted by the DS1/DSR technique, so that the utilization of the system is optimum and the system can furthermore be designed with commercially available devices.

A method in accordance with the present invention is especially suitable for servicing the various master stations a future DAB network as explained above because three to seven times as many programs—depending on the degree of data reduction applied—can be broadcast, as would be possible by the DS1/DSR transmission method which is limited to one stereo program (or two mono-programs) for each DS1 channel and to only 16 stereo programs for each DSR channel.

Similarly, the method according to the invention is also suitable for servicing a commonly used terrestrial VHF-FM broadcasting network or a so-called compatible DAB network, in which for every station only a single digital program signal is broadcast in the frequency band as for a VHF-FM broadcasting station.

As a wide-band broadcasting system, the method according to the present invention preferably uses a common satellite transmission system, but transmission may similarly also take place via a wide-band cable system of the type used, for example, by the Swiss Post for digital broadcasting services (Report No. VD14.1049 U of Jan. 24, 1991 by the Generaldirektion PTT). In the same way, the DSR signals could also be transmitted through an optical fiber distribution network or through radio links.

BRIEF DESCRIPTION OF THE DRAWINGS

Other objects, features and advantages of the invention, its organization, construction and operation will be best understood from the following detailed description taken in conjunction with the accompanying drawings.

DESCRIPTION OF THE PREFERRED EMBODIMENTS

Figure 1:
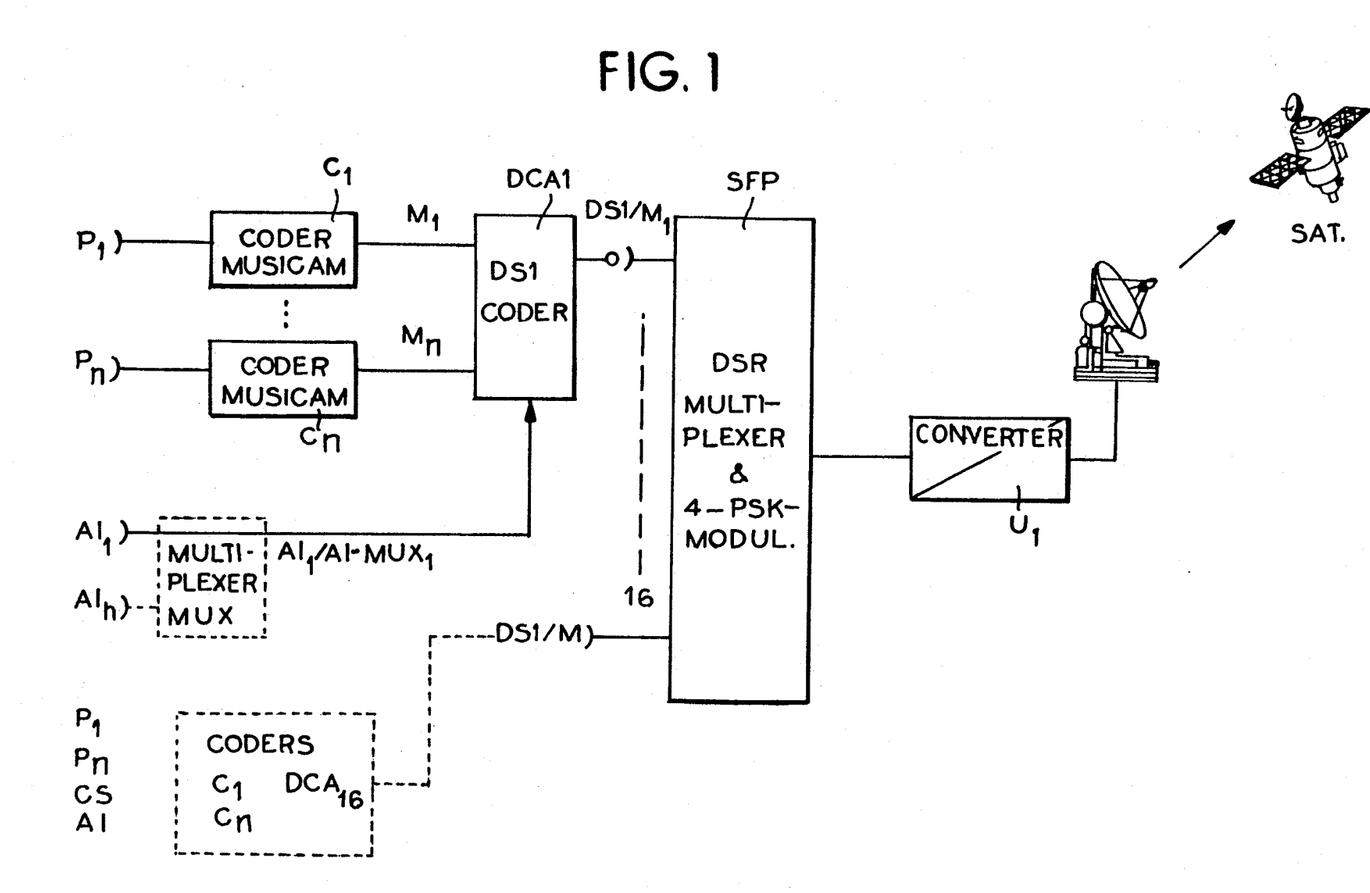
FIG. 1 is a block diagram of a source side of a satellite transmission system in which the method according to the invention is used.
Figure 2:
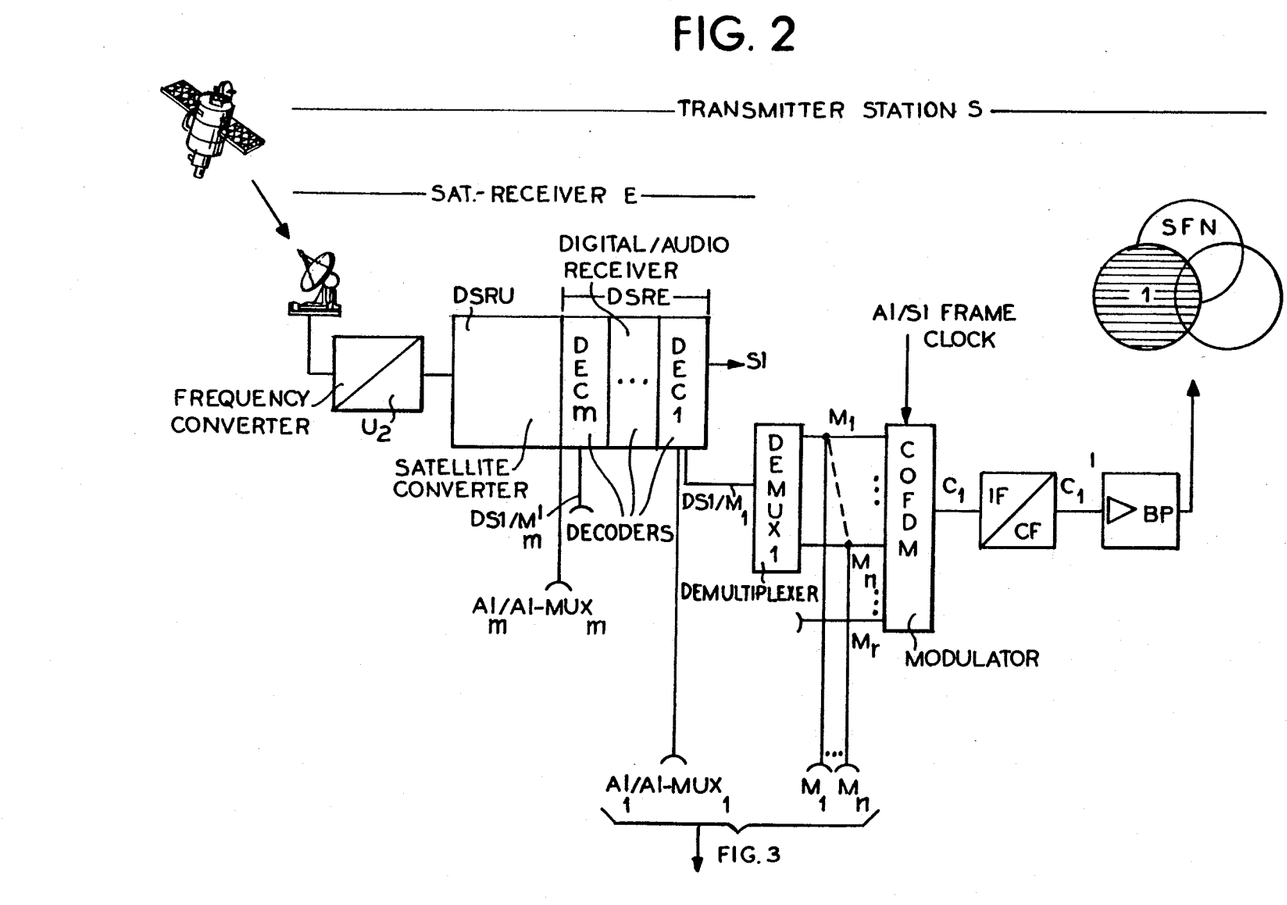
FIG. 2 illustrates the associated receiving part of the satellite transmission system at a master station of a DAB broadcasting network.

FIGS. 1 and 2 illustrate the block diagram of a system which operates in accordance with the method of the present invention for transmitting the audio signals P from one or several recording studios to the various master stations S of a broadcasting network. Transmission is effected in accordance with the known DS1/DSR technique. On the source side there are provided up to 16 DS1 coders DCA1 to DCA16, as well as a DSR multiplexer with a succeeding 4-PSK modulator (SFP), including 16 input terminals for coupling to up to 16 DS1 coders. Unlike the DS1 standard, each DS1 channel transmits not only a single audio signal, but in accordance with the invention, each DS1 channel transmits n data-reduced audio signals $M_1$ to $M_n$. Thus, for each DS1 coder, audio signals DS1/M are generated which are modified relative to the DS1 standard and are composed of a plurality of n data-reduced audio signals and are supplied to the inputs of the DSR multiplexer SFP.

In the embodiment illustrated in FIG. 1, the analog or digital audio monosignals or stereo signals P are respectively supplied to a coder $C_1$ to $C_n$ operating on the basis of the MUSICAM technique. The audio signals P, which may originally be 768 kbit/s (16 bit, 48 kHz), are thereby data-reduced to 128, 96 or 64 kbit/s, for example. These data-reduced audio signals $M_1$ to $M_n$ are then supplied to one of the 16 DS1 coders DCA1 to DCA16, in which these data-reduced audio signals $M_1$ to $M_n$ are coded on the basis of the DS1 method. In a practical embodiment, for example 4 MUSICAM coders C1 to C4 are provided for a respective stereo signal (n=4). Thus, a total of four data-reduced audio signals $M_1$ to $M_n$ for each DS1 coder are transmitted. MUSICAM coding is preferably performed already in the studio, and the DS1 coding could also be performed direct in the studio, but it is also possible initially to transmit the signals $M_1$ to $M_n$ via digital lines to the satellite earth station where DS1 coding is then performed. At the outputs of the DS1 coders DCA1 to DCA16, there appear the signals DS1/M1 to DS1/M16 which, with respect to frame structure and additional information, correspond to the original DS1-signals. In the data multiplexer SFP, the 16 DS1/M-signals are interlaced, and in combination with frame synchronizing words, a data stream is produced which is directly supplied to the 4-PSK-modulator. The error concealmennt at the input of the DSR multiplexer according to the DS1 standard is made inoperative for the application according to the present invention. The 4-PSK-modulated IF carrier is converted by a converter U1 to the satellite transmission frequency of e.g. 18 GHz and transmitted to the actual satellite SAT from where it is again transmitted at e.g. 12 GHz.

FIG. 2 is the block diagram of a DAB master station. Every single master station S of the serviced broadcasting network cooperates with a commonly used satellite receiver E in which the satellite signal received via the satellite antenna after frequency conversion in U2 (outdoor unit) and in a satellite converter DSRU is converted to a frequency which is suited for subsequent decoding. The output signal from this converter DSRU is provided to a digital audio receiver DSRE where it is decoded in a plurality (m) of decoders DEC1 to DECm. It is possible to select up to m DS1/M'-signals from the total of up to 16 transmitted DS1/M-signals. These DS1/M'-signals correspond to the original DS1/M-signals from the source side, but possess a different frame structure. Every single one of this total of m DS1/M'-signals is transferred through a demultiplexer DEMUX to the original MUSICAM signals M1 to Mn which are then provided to the modulator COFDM of the master station S as digital audio signals. It is thereby possible to select out of the multiplicity of all of the programs P offered by the source side the desired programs, and to broadcast these programs.

The actual DS1-DSR satellite transmission technique, commencing on the source side with the DS1 coders DCA1 to DCA16 via multiplexers, satellite transmitter, satellite, and satellite receiver including demultiplexers is of known structure such as described, for example, in "Neues yon Rohde & Schwarz", No. 114, page 14, incorporated herein by reference. The coders DCA of Ronde & Schwarz are used, for instance, as the DS1 coders, the multiplexer inclusive of the 4-PSK-modulator may be a unit SFP of Rohde & Schwarz, and the satellite receiver may be a combination of the digital audio converter DSRU and the digital audio receiver DSRE of Rohde & Schwarz. The additionally used MUSICAM coders $C_1$ to $C_n$ are configured of commercially available chips, so that the transmission system according to the invention can be made in highly economic fashion. The difference relative to the known DS1/DSR transmission technique resides in the fact that a single L/R stereo signal for each DSR1 channel encoded in accordance with the known 16/14-bit floating-point arithmetic with scale factor, no longer transmitted, but that a plurality of data-reduced audio signals $M_1$ to $M_n$ is transmitted across the net bit rate of 896 kbit/s of each signal DS1 signal, which audio signals are correspondingly data-reduced on the basis of psychoacoustic phenomena of the human ear. The scale factor technique in the DS1 and the bit shifting technique connected therewith may be retained because the scale factor is safely transmitted by 21-times repetition per each block with 64 samples, but it may also be made inoperative by simply fixing the scale factor to SKF=LOGIC 100, for example. Then the 14 bits are transmitted without shifting. Since the DS1 interface is internally configured for twice 16 bit/par. at a sampling rate of 32 kHz, wherein twice 14 bits are available as the net bit rate for transmission, the full net capacity of the DS1 signal is respectively available for transmission at parallel inputs of the DS1 coder. The net bit rate can be adapted to the multiple of the clock rate of 32 kHz in a very simple way. The clock rates will then, for example, directly correspond to the bit rates of audio-baseband encodings with data reduction according to MUSICAM.

Block encoding in the DSR channel with a 63/44 BCH code makes a distinction between protected and unprotected bit transmission. Protected here means that 2 bit errors Der each BCH block can be corrected, so that in the DSR channel there are available per each DS1:

2×11 bit/32 kHz DSR-protected
2×3 bit/32 kHz DSR-unprotected.

Figure 4:
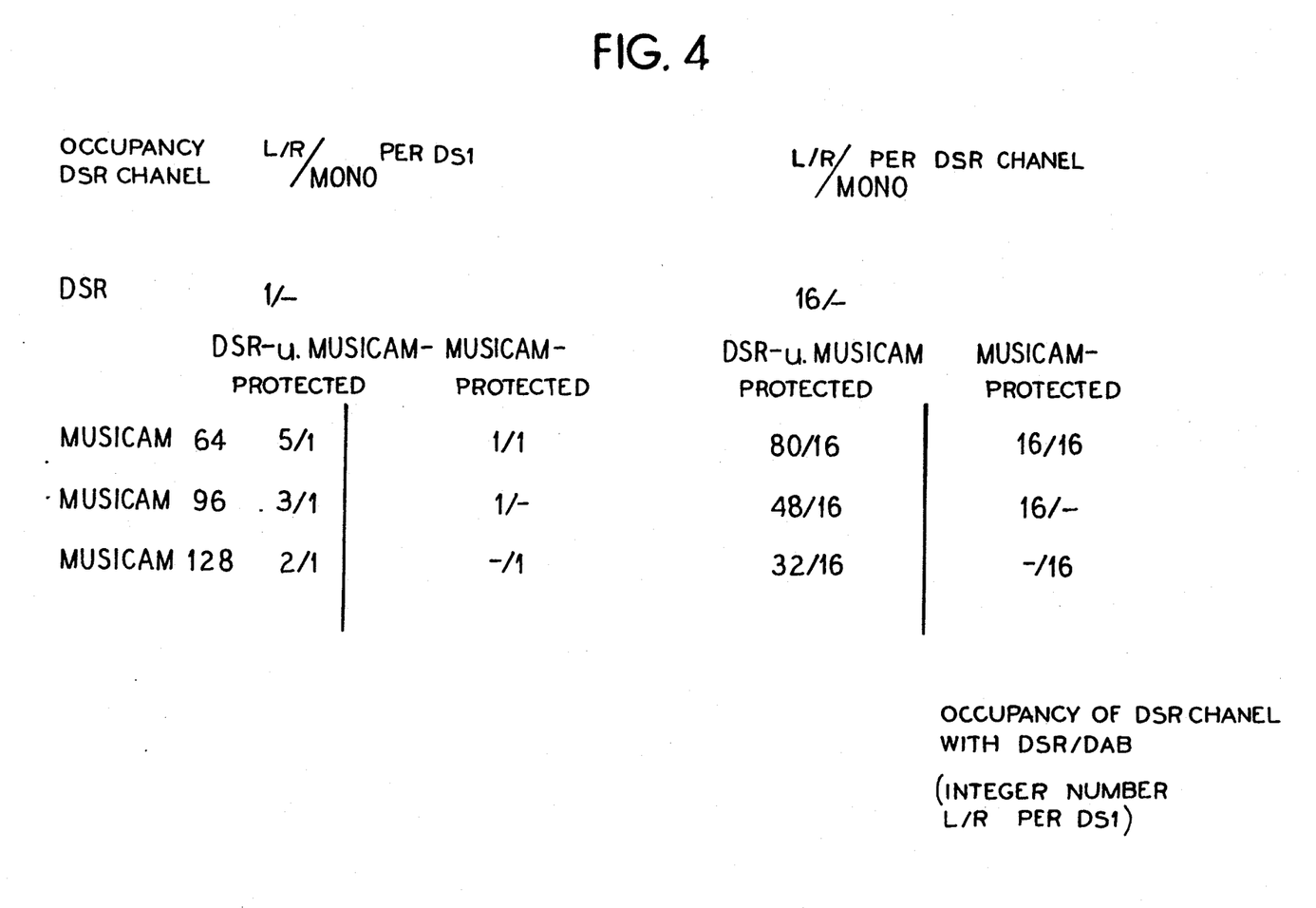
FIG. 4 is a table listing the multiplicity of programs which can be transmitted for each DSR channel in accordance with the method of the invention.

This distinction can be cancelled by scrambling at the input of the DS1 coder. Furthermore, the base-band encoding such as MUSICAM includes an error protection of its own. For example, with a bit-error rate BER $<10^{-3}$, the subjective quality of MUSICAM is negligibly affected. Since this BER condition holds for DSR, the unprotected 3 bits per 14 bits may also be used therein. The table of FIG. 4 shows the number of program channels L/R and mono per each DS1 channel and per each DSR channel, wherein a distinction is made between channels which are DSR- and MUSICAM-protected, and channels which are MUSICAM-protected. For example, the table specifies MUSICAM 64 for base-band encoding with 64 kbit/s/mono. The calculated channels are based on an integer number of L/R stereo signals per each DS1 channel.

Satellite receivers operating on the DSR principle are now available both as consumer types and as professional types. Both types make use of a demultiplexer/decoder as a chip component (e.g. SAA7500 of Philips Semiconductor). In this way, every receiver E may very simply and inexpensively be constructed of commercially available components. The demultiplexer/decoder provides the DS1/M'-data in bit-serial fashion to an output with non-corrected bit errors, and to a second output with error correction according to the DSR standard. These data are derived prior to the switching function "concealment". After corresponding demultiplexing, e.g. to the MUSICAM signals $M_1$ to $M_n$, the DS1/M'-data are supplied to the COFDM modulator of the broadcasting station which in accordance with the known DAB broadcasting network principle permits wide-band broadcasting of the programs, as has been described in detail in the already mentioned publication "Kunftige Systeme der digitalen Horfunkubertragung" by the Bayerische Rundfunk. This portion of every single master station S also has a known configuration.

The COFDM signals in the DAB simultaneous network must be both clock-synchronous and word-synchronous (i.e., bit-synchronous). Clock synchronism is obtained due to the fact that the DS1 coders are each synchronized by a clock signal CS1 of 1.024 MHz so that all DS1/M-signals and the DSR-signals are clock-synchronous. In order to achieve the additionally required word synchronism, a part of the DS1 data channel A1 with a net bit rate of 24 kbit/s, the so-called U/V channel for additional information, or a part of a free section in the so-called special-service main frame B of the DSR signal frame (special information S1 of the DSR frame of 32 kbit/s), is used for transmitting a corresponding word synchronizing signal. The "word synchronizing signal" additionally transmitted in this way may then be used in every single master station for word-synchronization of the broadcast programs.

Figure 3:
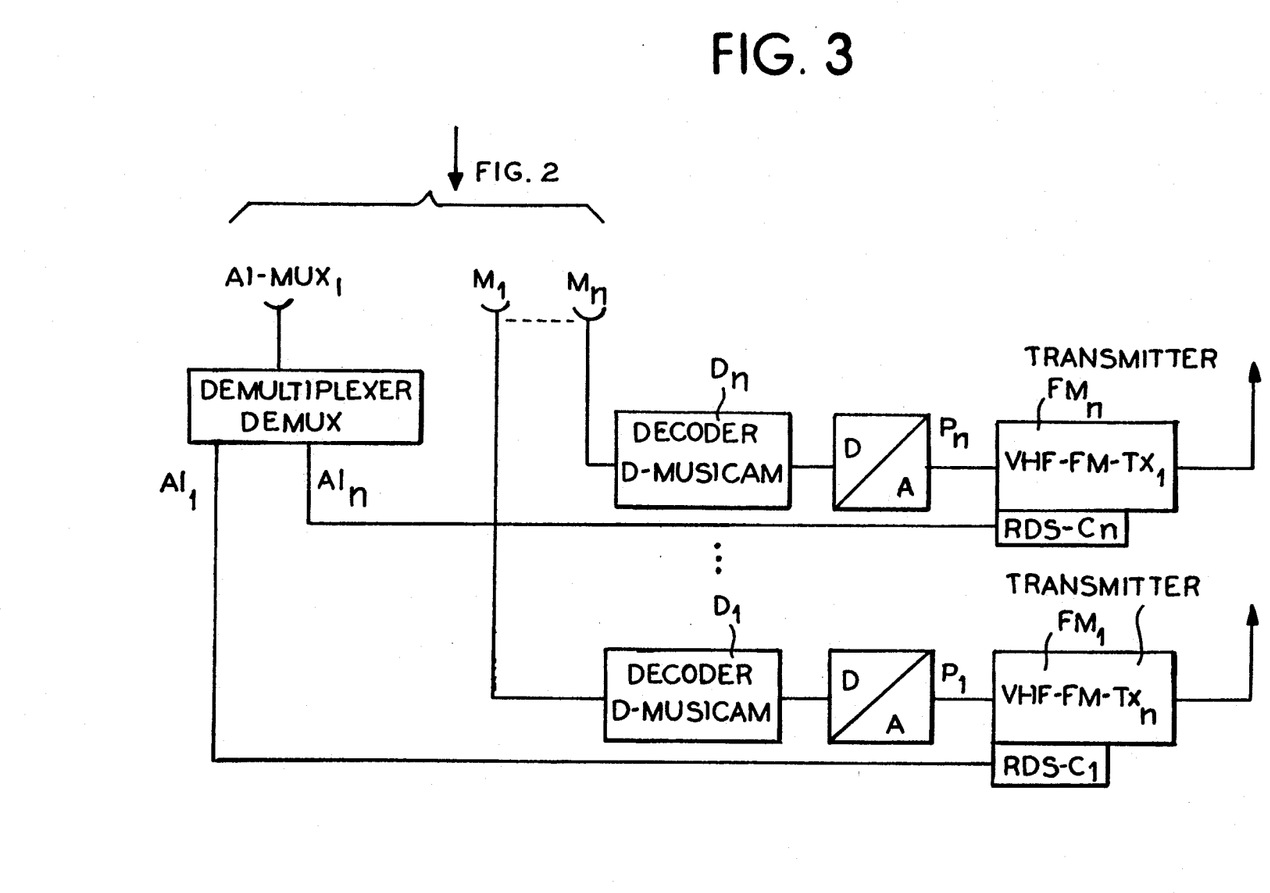
FIG. 3 is a modification of the system shown in FIG. 2 for feeding a VHF-FM-broadcasting network.

The method according to the invention is similarly suited in accordance with FIG. 3 for transmission of the audio signals from a studio to the individual broadcasting stations of a VHF-FM-broadcasting network. The source part of the satellite transmission link is again constructed as in FIG. 1, while the receiver part of the satellite transmission link of every single FM-broadcasting station FM1 to FMn according to FIG. 3 is provided with additional D/A-converters connected to the output side of the individual MUSICAM decoders $D_1$ to $D_n$ for producing the analog audio signals to be broadcast by the broadcasting station from the digital audio signals which have been separated via the demultiplexer and decoded in accordance with the MUSICAM technique.

Similar to the program supply to VHF-FM broadcasting stations, the method according to FIG. 2 may also be used for DAB broadcasting stations with only one digital program signal for each broadcasting station. This so-called "compatible DAB" is also based on MUSICAM and represents an in-band solution utilizing a VHF-FM-bandwidth.

In VHF-FM transmitter systems, so-called radio-data systems (RDS) are common by means of which program-dependent data which may be produced, for example, in the recorder studio, are co-transmitted to the user. In accordance with the method of the present invention, these RDS signals may also be transmitted to the RDS coder in the VHF-FM transmitter, in which the program-dependent RDS data A11 to A1n are correspondingly addressed in the recording studio for every singla MUSICAM channel M1 to Mn, and are combined by multiplexing to form a separate information unit A1-MUX and are then transmitted on the additional information channel of the DS1-signal, which is conducted in known manner in the DS1 coder DCA1 to DCA16. These additional data are then read out in the DSR receiver DSRE in the broadcasting station S as separate data, and after demultiplexing DEMUX, are provided to the RDS-coders RDS-C1 to RDS-Cn of the FM transmitters.

Of course, the transmission technique illustrated in FIGS. 1, 2 and 3 may also be used jointly, for instance when programs are to be provided simultaneously to a DAB broadcasting network and to a parallel-operating FM-broadcasting network. Moreover, it is not necessary that all of the DS1 channels of the transmission system are used for the purpose of the invention to compose the DS1/M-signals of a plurality of additionally data-reduced audio signals, but it is quite possible to provide a portion of the available 16 DSD1-channels in the usual way with a pure, non-data-reduced digital DS1 audio signal and to utilize only the remaining DS1 channels for the purposes of the invention, and also with different data rates.

Also, the method according to the invention may be used directly to extend the known digital broadcasting system DSR (Extended DSR: EDSR). For this purpose, it is only required that the consumer receiver for receiving the DSR satellite broadcasts be equipped with a corresponding MUSICAM decoder chip having a respective selection logic. The user of such a receiver may then directly select and listen to the desired data-reduced audio signals from the digital audio signals transmitted in accordance with the inventive method. It is thus possible to extend the known DSR transmission system to a multiple of the programs offered so far.

Figure 5:
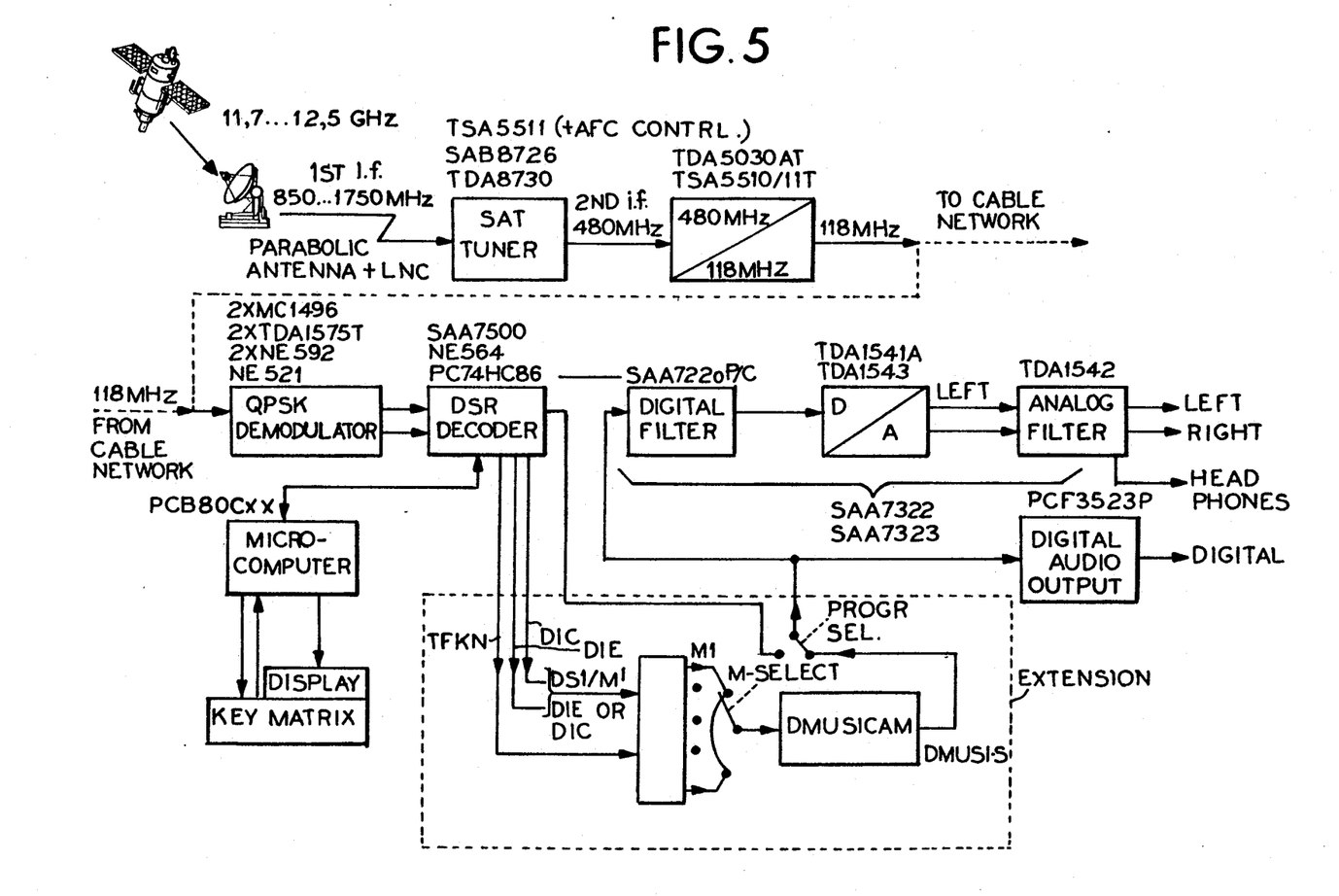
FIG. 5 shows by way of a block diagram how a usual DSR consumer receiver can be modified for directly receiving audio signals which are transmitted in accordance with the method of the invention.

FIG. 5 illustrates by way of a block diagram of a DSR satellite broadcast receiver FT990 of Philips how such a commercially available consumer receiver can be supplemented in a simple way for directly receiving digital audio signals transmitted in accordance with the invention. Basically, this consumer-type receiver of FIG. 5 corresponds to the equipment combination DSRU, combined with a digital audio receiver DSRE of Rohde & Schwarz, as illustrated and described in FIG. 2. The signal received via a satellite antenna is converted in a tuner with a succeeding frequency converter to an intermediate frequency of 118 MHz, and is then fed to the 4-PSK-demodulator. The demodulated signal is provided to the DSR decoder SAA 7500. The decoded signal is provided via a digital filter to a D/A-converter, and at the output of an analog filter the stereo sound signal received via satellite is available for further processing.

This commercially available structure of a consumer-type receiver can readily be converted by merely adding a demultiplexer DEMUX and a program selection logic M-select, to provide a receiver suited for directly receiving digital audio signals transmitted in accordance with the invention via a satellite link. The outputs TFKN and DIE or DEC of the DSR decoder are coupled to the demultiplexer DEMUX. The output TFKN provides a clock signal of 160 bit/frame (31.25 $\mu$s). The output DIE provides the DS1/M'-signal in 77 bit/-blocks in DSR-uncorrected form. The output DEC provides the DS1/M'-signal in 63 bit-BCH-blocks in DSR-corrected form. The DS1/M'-signals supplied from the outputs DEC or DIE to the demultiplexer DEMUX are reconverted to the original MUSICAM signals $M_1$ to $M_n$. The MUSICAM signal desired by the user is selected by means of the selection logic M-select associated with the output of the demultiplexer. The selected MUSICAM signal is provided to the succeeding MUSICAM decoder, which may again be a commercially available chip, for instance by Philips Semiconductor. The decoded signal of the MUSICAM decoder is then provided to the input of the D/A converter via a selection switch. In this way, the customer may select and listen to any desired MUSICAM signal fed on the source side via the satellite link. The selection switch makes it possible to use the consumer-type receiver either in its initial mode, i.e. up to 16 stereo signals may be transmitted per each DSR, while in the other position of the switch, the MUSICAM-encoded audio signals are analyzed. Thus, plural audio signals are transmitted in every single DS1 channel and may be selected by the user.

By way of this simple extension of a consumer-type DSR receiver with a MUSICAM decoder and a simple demultiplexer circuit, it is possible to extend the number of programs available to a user from the previous 16 programs to, for instance, 64 stereo programs when MUSICAM with a 96 kbit/s/monosignal is used. Both the MUSICAM decoder and the demultiplexer are simple, commercially available LSI chips, so that the available programs may, for example, be extended by a factor of 4 in a highly economical way.

Although I have described my invention by reference to particular illustrative embodiments thereof, many changes and modifications of the invention may become apparent to those skilled in the art without departing from the spirit and scope thereof. I therefore intend to include within the patent warranted hereon all such changes and modifications as may reasonably and properly be included within the scope of my contribution to the art.

I claim as my invention:

1. A method of transmitting digital audio signals from recording studios to various master stations of a broadcasting network, comprising the steps of:

initially reducing data flow of the digital audio signals to be transmitted in accordance with a technique utilizing a psychoacoustic phenomena of the human ear so as to create data-reduced audio signals;

respectively coding in a baseband in accordance with a DS1 (Digital Satellite) technique a first plurality of said data-reduced digital audio signals and outputting a first DS1/M signal composed of the first plurality of data-reduced digital audio signals;

respectively coding in a baseband in accordance with the DS1 a second plurality of said data-reduced digital audio signals and outputting a second DS1/M signal composed of the second plurality of data-reduced digital audio signals;

transmitting to the various master stations of the broadcasting network the at least first and second DS1/M signals in accordance with a DSR (Digital Satellite Radio) technique by means of a wide-band transmission system, and wherein the at least first and second DS1/M signals modulate a DSR 4-PSK modulator of a transmitting station enabling a simultaneous transmission and a subsequent simultaneous recovery of the original digital audio signals at a respective receiver for simultaneous presentation of the digital audio signals at the master stations of the broadcast network.

2. A method according to claim 1 wherein a plurality of DS1/M signals are created and transmitted with the DSR technique.

3. A method according to claim 1 wherein the DS1/M signal is transmitted in accordance with the DSR technique via a satellite transmission link to the various master stations.

4. A method according to claim 1 wherein the DS1/M signal is transmitted in accordance with the DSR technique via a cable transmission link to the various master stations.

5. A method of transmitting digital audio signals from recording studios to various master stations of a broadcasting network, comprising the steps of:
  initially reducing data flow of the digital audio signals to be transmitted in accordance with a technique utilizing a psychoacoustic phenomena of the human ear so as to create 16 groups of data-reduced audio signals, each group comprising a plurality of said data reduced digital audio signals;
  respectively coding in accordance with the DS1 (Digital Satellite) technique 16 groups of said data-reduced digital audio signals and outputting respective DS1/M signals composed of the respective groups of data-reduced digital audio signals; and
  transmitting to the various master stations of the broadcasting network the thus produced DS1/M signals in accordance with a DSR technique by means of a wide-band transmission system, and wherein the at least one DS1/M signals modulate a DSR (Digital Satellite Radio) 4-PSK modulator at a transmitting station enabling a simultaneous transmission and a subsequent simultaneous recovery of the original digital audio signals at a respective receiver for simultaneous presentation of the digital audio signals at the master stations of the broadcast network.

6. A system for transmitting digital audio signals from recording studios to various master stations of a broadcasting network, comprising:
  a wide-band transmission link between the recording studios and the various master stations of the broadcasting network;
  at a transmitting station of said wide-band transmission link a DSR (Digital Satellite Radio) multiplexer with a four-PSK modulator having its output coupled to the wide-band transmission link and having a plurality of inputs coupled to respective DS1(Digital Satellite) coders;
  inputs of each of the DS1 coders being coupled to a respective plurality of coder means to which the digital audio signals to be transmitted are fed, said coder means each reducing a data flow of the respective digital audio signal in accordance with a technique which utilizes psychoacoustic phenomena of the human ear so that respective data-reduced audio signals are coupled to the respective DS1 coders, said 4-PSK modulator modulating a transmitter of said transmission link enabling a simultaneous transmission of the audio signals which permits a subsequent simultaneous recovery of the original digital audio signals at a respective receiver for simultaneous presentation of the digital audio signals at the master stations of the broadcast network; and
  at a receiver side of said wide-band transmission link the master stations having a DSR decoder means for selecting a plurality of DS1/M' signals from the transmitted DS1/M signals, and a demultiplexer means for converting the selected DS1/M' signals to the original data-reduced digital audio signals.

7. A system according to claim 6 wherein the original data-reduced digital audio signals are directly fed to a modulator of the master station.

8. A system according to claim 7 wherein at least one of the master DAB stations has means for broadcasting a single digital program signal by utilizing a VHF-FM-bandwidth.

9. A system according to claim 8 wherein at the source side of the wide-band transmission link means are provided for clock synchronizing the DS1 coders, and means are provided for transmitting a synchronizing signal in a section of an additional information channel of at least one of said DS1/M or DSR signals so that feeding of the original data-reduced digital signals to a modulator of said master station at said receiver side can be word-synchronized.

10. A system according to claim 6 wherein said data-reduced digital audio signals produced from said demultiplexer means at the receiver side are connected to decoder means corresponding to the source-side decoder means using the psychoacoustic phenomena of the human ear so as to produce original non-data reduced digital audio signals which are then connected through digital-to-analog converter means for creating analog audio signals which are then fed to modulators of VHF-FM transmitters of the master station.

11. A system according to claim 10 wherein at said source side means is provided for combining program-dependent RDS data produced in the recording studio and for feeding such data to at least one of said DS1 coders, said at least one DS1 coder having means for transmitting such RDS data in an additional information section of at least one DS1/M signal fed to said DSR multiplexer and four PSK modulator, and at said receiver side at said master station, said DSR decoder means containing means for providing said RDS data as separate data where they are fed to RDS decoders of said VHF-FM-transmitters.

12. A system for transmitting digital audio signals from recording studios to various master stations of a broadcasting network, comprising:
  a wide-band transmission link between the recording studios and the various master stations of the broadcasting network;
  at a source side of said wide-band transmission link a DSR (Digital Satellite Radio) multiplexer with a four-PSK modulator having its output coupled to the wide-band transmission link and having a plurality of inputs coupled to respective DS1(Digital Satellite) coders;
  inputs of each of the DS1 coders being coupled to a respective plurality of coder means to which the digital audio signals to be transmitted are fed, said coder means each reducing a data flow of the respective digital audio signal in accordance with a technique which utilizes psychoacoustic phenomena of the human ear so that respective data-reduced audio signals are coupled to the respective DS1 coders, said 4-PSK modulator modulating a transmitter of said transmission link enabling a simultaneous transmission of the audio signals which permits a subsequent simultaneous recovery of the original digital audio signals at a respective receiver for simultaneous presentation of the digital audio signals at the master stations of the broadcast network;

at said source side said DSR multiplexer having some of its inputs connected to receive said DS1/M signals from said respective DS1 coders and other of said inputs connected to receive non-data-reduced DS1 signals; and at a receiver side of said wide-band transmission link the master stations having a DSR decoder means for selecting a plurality of DS1/M' signals from the transmitted DS1/M signals, and a demultiplexer means for converting the selected DS1/M' signals to the original data-reduced digital audio signals.

13. A system for transmitting digital audio signals from recording studios to various master stations of a broadcasting network, comprising:

means for data-reducing a plurality of digital audio signals in accordance with a technique utilizing a psychoacoustic phenomena of the human ear in order to produce respective groups of data-reduced audio signals, each group comprising a plurality of said data-reduced audio signals;

means for coding said respective data-reduced digital audio signals in accordance with a DS1 (Digital satellite) technique and outputting a plurality of DS1/M signals each composed of the respective groups of data-reduced digital audio signals; and means for transmitting the plurality of DS1/M signals in accordance with DSR (Digital Satellite Radio) technique by means of a wideband transmission system to the various master stations of the broadcasting network, said means for transmitting having a modulator means and wherein said DS1/M signal modulates said modulator means enabling a simultaneous transmission permitting a subsequent simultaneous recovery of the original digital audio signals at a respective receiver for simultaneous presentation of the digital audio signals at the master stations of the broadcast network.

14. A system according to claim 13 wherein at a common consumer-type DSR receiver means for receiving signals at a receiving side of said wide band transmission system, a decoder means is provided corresponding to said source side means for data-reducing for utilizing the psychoacoustic phenomena of the human ear, said receiver means further comprising a demultiplexer and a selection logic means for selecting desired programs.

* * * * *